United States Patent
Alsager (10) Patent No.: US 12,245,583 B1
(45) Date of Patent: Mar. 11, 2025

(54) BIRD STAND

(71) Applicant: Jan Alsager, Three Lakes, WI (US)

(72) Inventor: Jan Alsager, Three Lakes, WI (US)

( * ) Notice: Subject to any disclaimer, the term of this patent is extended or adjusted under 35 U.S.C. 154(b) by 166 days.

(21) Appl. No.: 18/095,521

(22) Filed: Jan. 10, 2023

Related U.S. Application Data (60) Provisional application No. 63/278,094, filed on Nov. 10, 2021.

(51) Int. Cl.
*A01M 31/06* (2006.01)
*A01M 31/00* (2006.01)
*F16M 11/00* (2006.01)
*F16M 11/20* (2006.01)
*F16M 13/02* (2006.01)

(52) U.S. Cl.
CPC ............ *A01M 31/00* (2013.01); *F16M 11/20* (2013.01); *A01M 31/06* (2013.01); *F16M 13/02* (2013.01); *F16M 2200/08* (2013.01)

(58) Field of Classification Search
CPC ....... A01M 31/00; A01M 31/06; F16M 11/20; F16M 13/02
USPC .......................................... 248/156; 43/2, 3
See application file for complete search history.

(56) References Cited

U.S. PATENT DOCUMENTS

| | | | |
|---|---|---|---|
| 977,071 A | 11/1910 | Crandall | |
| 1,083,027 A | 12/1913 | Pancke | |
| 1,636,771 A * | 7/1927 | Glaberman | A47F 5/06 248/158 |
| 3,923,277 A | 12/1975 | Perrault et al. | |
| 4,243,164 A | 1/1981 | Burlison et al. | |
| 4,317,257 A | 3/1982 | Engel | |
| 4,460,028 A | 7/1984 | Henry | |
| 4,828,307 A | 5/1989 | Sokol et al. | |
| 5,015,532 A | 5/1991 | Knight | |
| 5,064,725 A | 11/1991 | Acker | |
| 5,437,935 A | 8/1995 | Fredeen | |
| 5,472,765 A | 12/1995 | Green | |
| 5,569,071 A | 10/1996 | Metier et al. | |
| 6,135,333 A | 10/2000 | Tucker et al. | |
| 6,142,547 A | 11/2000 | Bowerman | |
| 6,296,559 B1 | 10/2001 | Kinnebrew | |
| 6,364,261 B1 | 4/2002 | Vass, Jr. | |
| 6,389,655 B2 | 5/2002 | Libecco | |
| 6,561,468 B2 | 5/2003 | Williamson | |
| 7,028,429 B1 * | 4/2006 | Druliner | A01M 31/06 43/3 |
| 7,029,045 B2 | 4/2006 | Tumminaro | |
| 7,059,955 B2 | 6/2006 | Green et al. | |
| 7,272,906 B1 * | 9/2007 | Spaulding, Sr. | A01M 31/06 248/156 |
| 7,784,213 B1 | 8/2010 | Primos | |
| 8,168,305 B1 | 5/2012 | Peterson | |
| 8,191,304 B2 | 6/2012 | Poorman | |
| 8,336,855 B2 | 12/2012 | Griffiths | |
| 8,573,417 B1 | 11/2013 | Anderson | |
| 8,616,601 B1 | 12/2013 | Coughlin et al. | |

(Continued)

*Primary Examiner* — Tan Le
(74) *Attorney, Agent, or Firm* — Lund IP, PLLC (57) ABSTRACT

An assembly includes a base a bar including a first straight section extending upright from the base, a curved section extending over the base and a second straight section extending further over the base, a first mounting bar extending through a first hole in the second straight section, and a second mounting bar extending through a second hole in the second straight section.

28 Claims, 9 Drawing Sheets

(56) References Cited

U.S. PATENT DOCUMENTS

| | | | |
|---|---|---|---|
| 8,764,453 B2 | 7/2014 | Swarthout | |
| 9,248,696 B2 | 2/2016 | Maria et al. | |
| 9,346,315 B2 | 5/2016 | Powell | |
| 9,622,468 B2 | 4/2017 | Downard | |
| 9,877,473 B2 | 1/2018 | Bartel | |
| 9,962,990 B2 | 5/2018 | Russell | |
| 10,363,772 B2 | 7/2019 | Brown | |
| 11,039,609 B1 | 6/2021 | Brooks | |
| 11,199,288 B1 * | 12/2021 | Alsager | A01M 31/00 |
| 11,517,011 B1 * | 12/2022 | Barker | F16M 13/02 |
| 2003/0082316 A1 | 5/2003 | Scott | |
| 2004/0250461 A1 | 12/2004 | Dryer | |
| 2005/0268522 A1 * | 12/2005 | Foster | A01M 31/06 43/3 |
| 2013/0045470 A1 | 2/2013 | Bain | |
| 2013/0126689 A1 | 5/2013 | Richards | |
| 2015/0108295 A1 * | 4/2015 | Brooks | A01M 31/06 248/156 |
| 2017/0176125 A1 | 6/2017 | Pauley | |
| 2017/0303529 A1 * | 10/2017 | Weber, Jr | A01M 31/06 |
| 2017/0361643 A1 | 12/2017 | Brown | |
| 2019/0021305 A1 | 1/2019 | Carvalho | |
| 2019/0327956 A1 | 10/2019 | Bartel | |

\* cited by examiner

BIRD STAND

CROSS REFERENCE TO RELATED APPLICATION

This application claims the benefit of U.S. Provisional Patent Application No. 63/278,094, titled BIRD STAND, filed Nov. 10, 2021, the entire contents of which are incorporated by reference herein.

TECHNICAL FIELD

This disclosure relates to display stands; and more particularly, but without limitation, display stands for photography.

BACKGROUND

Bird hunting is a popular endeavor worldwide. Many hunters enjoy memorializing a successful hunt with a photo. Common practice is to pose with a taken animal.

BRIEF SUMMARY

This disclosure is directed to techniques for holding a bird in upright position. A display stand as disclosed herein can hold a bird in an upright position with much of the stand blocked from view by the body of the animal depending on the angle of view of the camera. By supporting a harvested animal in a natural position, display stands disclosed herein facilitate exceptional photographs to memorialize a successful hunt.

In an example, this disclosure is directed to an assembly including a base, a bar including a first straight section extending upright from the base, a curved section extending over the base and a second straight section extending further over the base, a first mounting bar extending through a first hole in the second straight section, and a second mounting bar extending through a second hole in the second straight section In another example, this disclosure is directed to a kit comprising a bar including a first straight section, a curved section extending over a base and a second straight section extending further over the base, a first mounting bar extending through a first hole in the second straight section, a second mounting bar extending through a second hole in the second straight section, and the base. The base includes a planar platform, an upwardly oriented tube fixed at an angle to the planar platform, the upwardly oriented tube configured to removably receive a second end of the bar, the second end of the bar being opposite the second straight section, leg tubes aligned with and fixed to the planar platform, and removable legs configured for insertion in the leg tubes.

DETAILED DESCRIPTION

Figure 1:
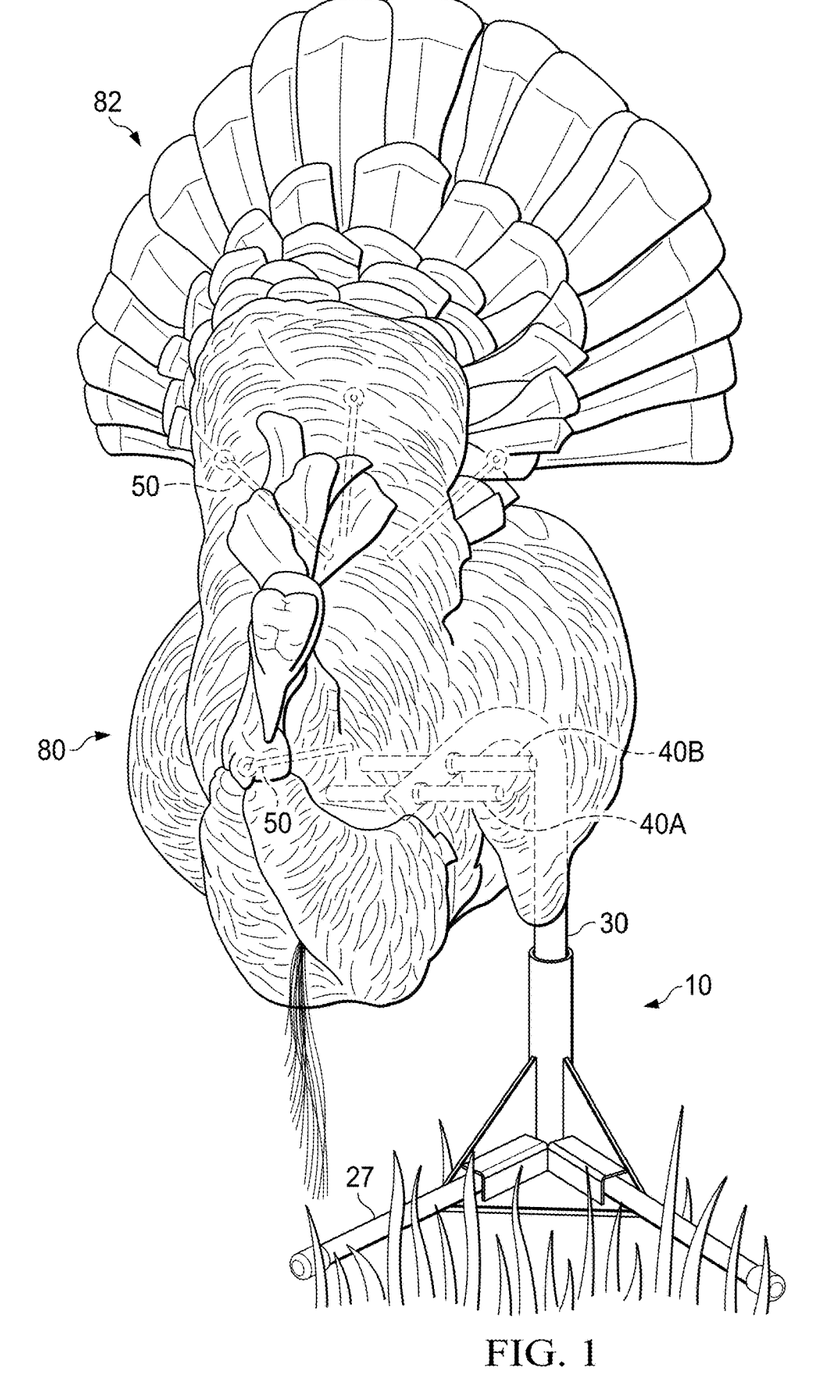
FIG. 1 is a photo of a bird stand holding a turkey in an upright, elevated position.

FIG. 1 illustrates a turkey 80, with bird stand 10 holding a turkey in an upright, elevated position. Stand 10 is largely hidden from view by the body of turkey 80. In addition, legs 27 of the base of stand 10 are hidden from view beneath ground cover, such as leaves, grass, or snow.

FIG. 1 further shows four pins 50 used to secure the body of turkey 80 in a natural position. Specifically, one pin is used to pin the head and neck of turkey 80 to its body, and three pins are used to spread out the tailfeathers and pin the tail in an upright position. For example, two pins may be used on each of the outermost feathers to spread out the tail, while the last attaches to a central portion of the tail to hold the tail upright, e.g., by hooking a tailfeather and penetrating into the pope's nose of the turkey 80. For a picture, the pins and their hooks are hidden from view by the feathers of turkey 80.

Figure 4A:
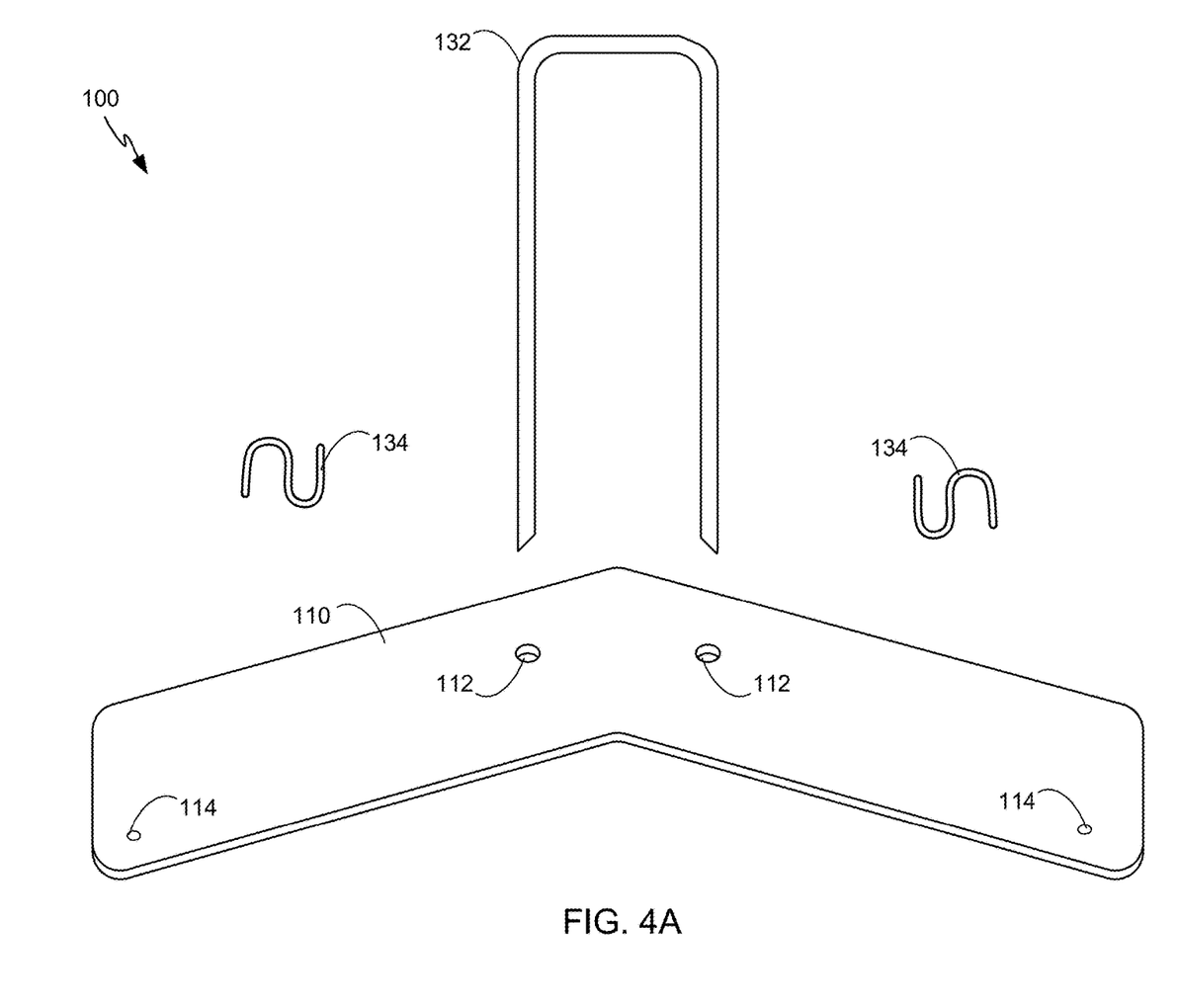
FIGS. 4A-4C illustrate a tail fan support configured to fan out tailfeathers of a turkey.
Figure 4B:
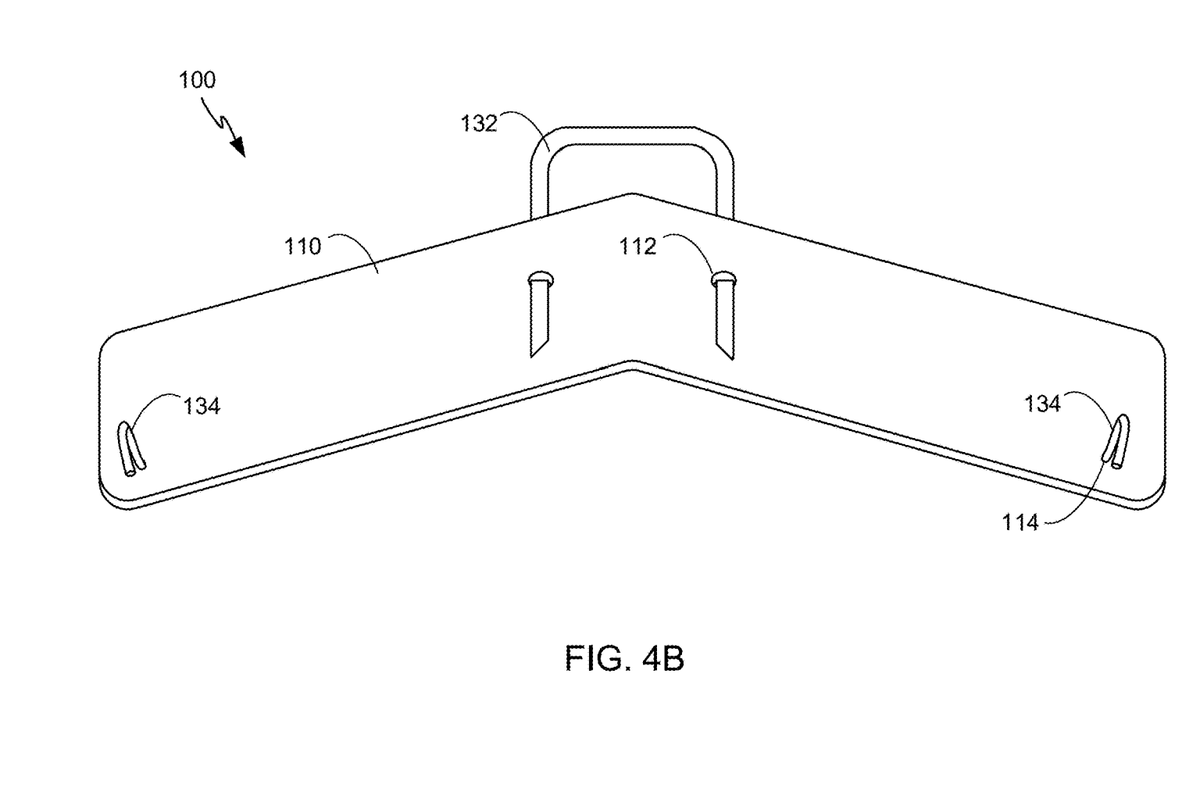
Figure 4C:
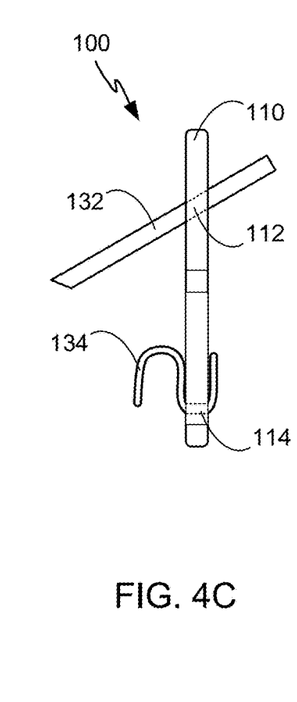

While any suitable pinning mechanism may be used, the inventors found that straight pins from 2-6 inches long, such as about 4 inches long were suitable for use as pins 50. Moreover, open hooks on the pins may be used for attachment to the tail feathers and to prevent the neck from pulling through. In an alternative example, pins 50 used to hold tailfeathers 82 may be replaced to tail fan support 100 (FIGS. 4A-4C).

Figure 2A:
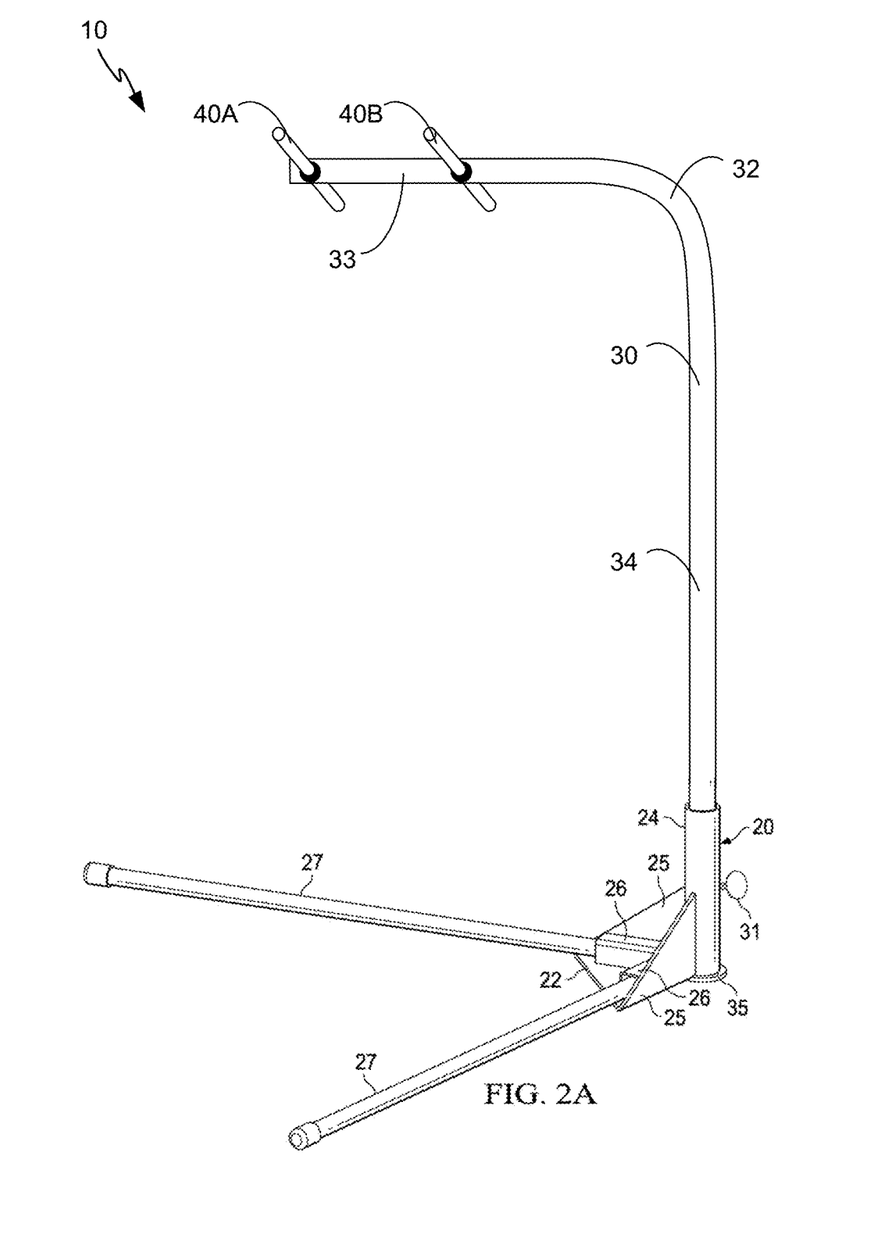
FIGS. 2A-2C illustrate the bird stand of FIG. 1.
Figure 2B:
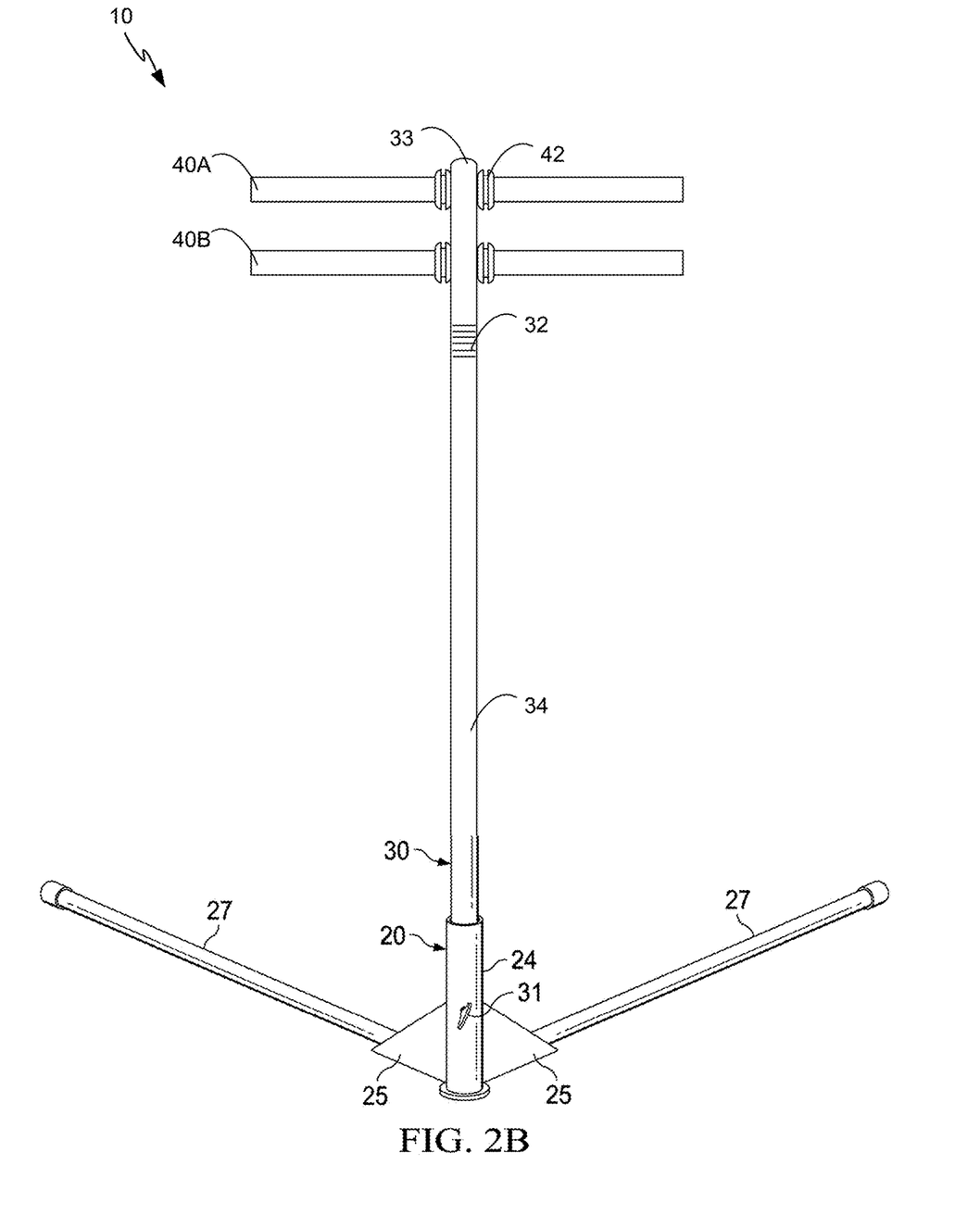
Figure 2C:
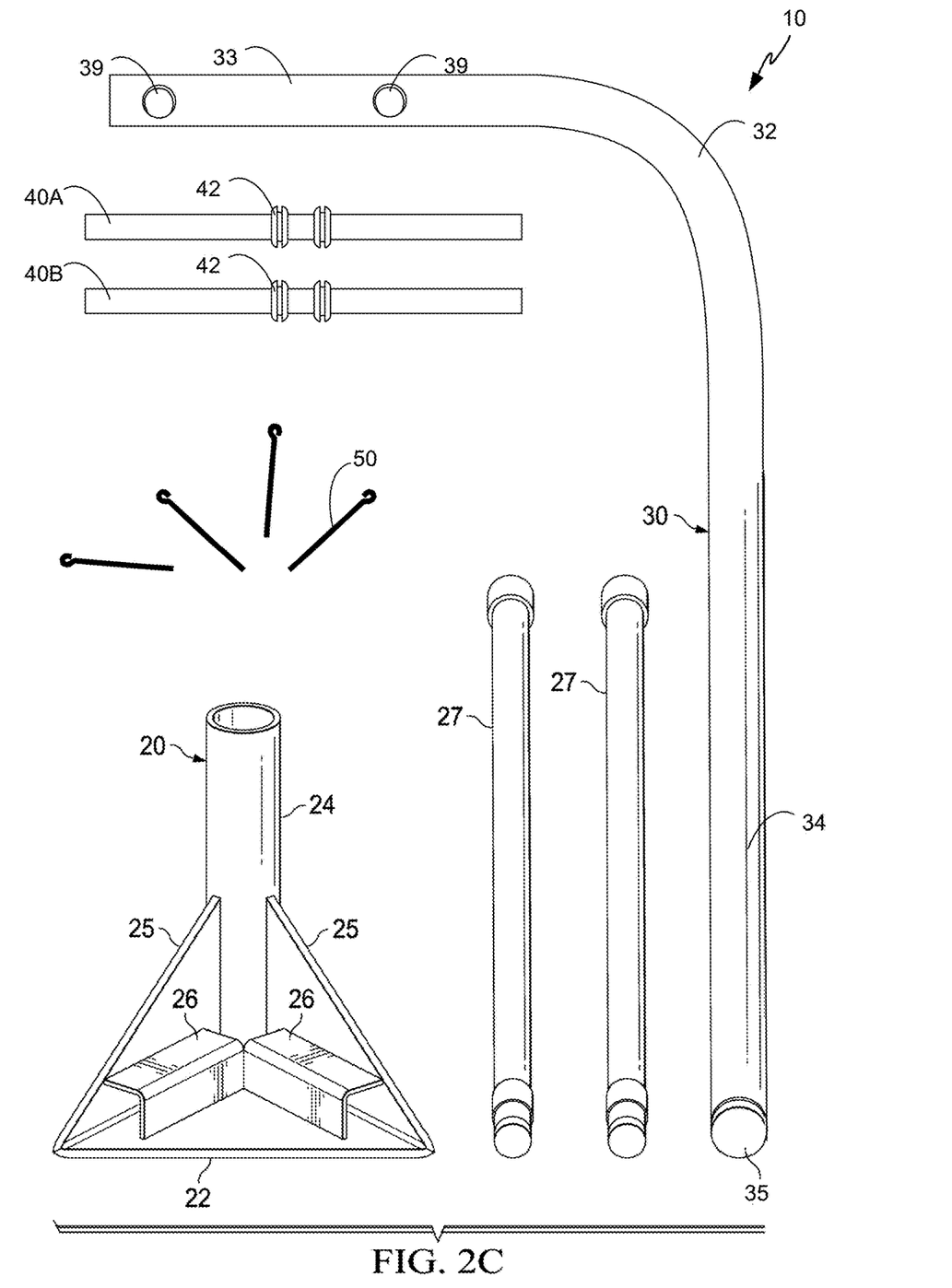
Figure 3:
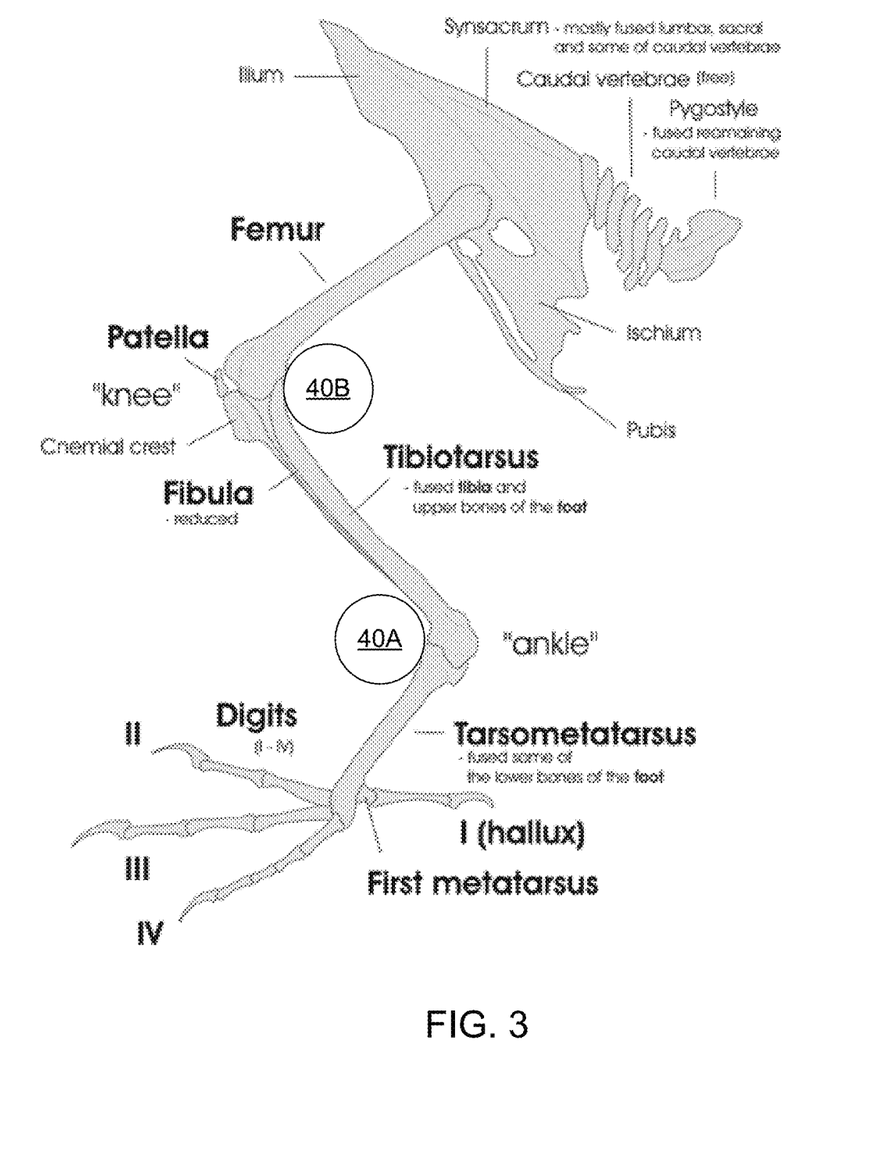
FIG. 3 illustrates a skeleton of a turkey leg relative to the position of the mounting bars of the bird stand of FIG. 1.

FIGS. 2A-2C illustrate bird stand 10 in further detail. Specifically, FIG. 2A is a side view of stand 10, FIG. 2B is a rear view of stand 10, and FIG. 2C shows the components of stand 10 as a kit 12 broken down for easy transport. FIG. 3 illustrates a skeleton of a turkey leg relative to the position of the mounting bars 40 of bird stand 10.

As shown in FIGS. 2A-2C, stand 10 is an assembly including a base 20 with removable legs 27, a bar 30 extending upright from base 20, and a mounting bars 40A, 40B (collectively, "bars 40") on the end of bar 30. Mounting bars 40 are mounted to an end 33 of bar 30 opposite base 20 and extending over base 20. Mounting bars 40 are straight sections of tubing extending through holes 39 in end 33 of bar 30. Mounting bars 40 include grommets 42 to prevent mounting bars 40 from sliding out of holes 39.

As best shown in FIG. 3, a bird, such as turkey 80 is supported by placing the ankles of the bird over either side of the mounting bar 40A, and the knee joint around mounting bar 40B. The legs are wedged against both mounting bars 40A, 40B by the body weight of the bird, and the bird is thereby supported in the upright position shown in FIG. 1.

Holes 39 are spaced to conform to the anatomy of a supported bird. For example, holes 39 may be spaced between 3 inches and 10 inches, such as about 4-6 inches for turkeys, such as about 5 inches for turkeys. Likewise, the length of mounting bars 40 is selected to fit the anatomy of the bird while allowing mounting bars to remain hidden. In some examples, the mounting bars 40 are between 4 inches and 12 inches in length, such as between 6 inches and 10 inches in length for turkeys such as about 8 inches in length for turkeys.

In this manner, mounting bars 40 securely attached to the legs of a bird, while bar 30 and base 20 provide a stable frame to support the body of the bird in an upright position. Moreover, as shown in FIG. 1, the assembly of stand 10 is largely hidden from view behind the body of the bird, thereby providing an opportunity to pose with the bird in a natural position for photographs following a successful hunt.

Base 20 includes a planar platform 22, and an upwardly oriented tube 24 fixed at an angle to planar platform 22. Tube 24 removably receives end 35 of bar 30, end 35 being opposite mounting bars 40. Base 20 further includes one or more gussets 25 extending between planar platform 22 and upwardly oriented tube 24. In some examples, planar platform 22 and gussets 25 are a unitary component formed from a bent plate and welded to tube 24.

Leg tubes 26 are aligned with and fixed to planar platform 22. Removable legs 27 are configured for insertion in leg tubes 26 to give base 20 a wide platform. As inserted in leg tubes 26, removable legs 27 extend outwardly and generally parallel to planar platform 22 underneath mounting bars 40, although the alignment of mounting bars 40 relative to base 20 is adjustable by turning bar 30 within tube 24. In some examples, removable legs 27 a close or interference fit within leg tubes 26. In other examples, a mechanism, such as a screw, pin, or spring clip, may be used to engage removable legs 27 with leg tubes 26.

Bar 30 includes a straight portion 34 extending upward from base 20 and a curved section 32 extending over base 20. In the illustrated example, thumb screw 31 secures end 35 of bar 30 within tube 24, and may be used to fix the angle of mounting bars 40 relative to base 20. In other examples, a different mechanism, such as a pin or spring clip, may be used to secure end 35 of bar 30 within tube 24. In further examples, end 35 of bar 30 may simply provide a close or interference fit with tube 24.

Figure 5:
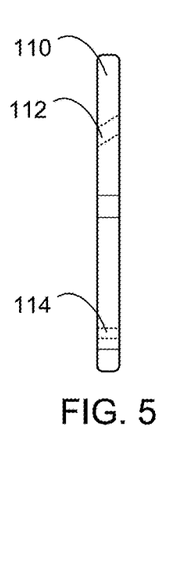
FIG. 5 is a side view of a brace of the tail fan support of FIGS. 4A-4C.
Figure 6:
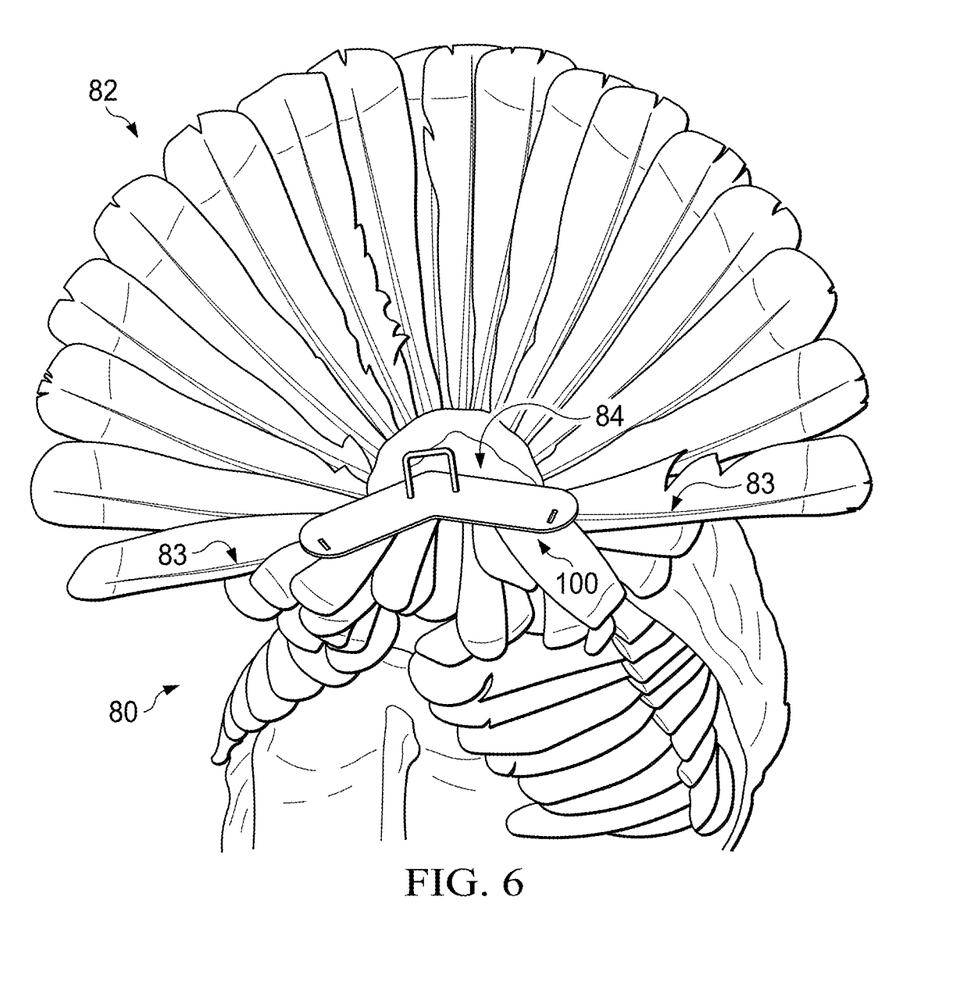
FIG. 6 is a conceptual illustration of the tail fan support of FIGS. 4A-4C fanning out tailfeathers of a turkey.

FIGS. 4A-4C illustrate a tail fan support 100, which serves as an alternative to pins 50 for securing tail feathers 82 in a fanned-out position. Tail fan support 100 is configured to fan out tailfeathers 82 of a harvested turkey 80 for photographing. Tail fan support 100 may be part of a kit including bird stand 10 or 210. FIG. 5 is a side view of a brace of the tail fan support of FIGS. 4A-4C. FIG. 6 is a conceptual illustration of the tail fan support 100 fanning out tailfeathers 82 of the turkey 80.

Tail fan support 100 includes a brace 110 including fasteners 134 configured to attach to outer tailfeathers 83 to fan out tailfeathers 82 of turkey 80. The brace 110 is formed from a compliant material with a central bend shaped to curve over the pope's nose 84 with the fasteners 134 below the pope's nose 84 to facilitate securing the outer tailfeathers 83 with the fasteners 134 and broadly fan out tailfeathers 82. For example, brace 110 may be cut from a sheet of compliant material, such as a foam, elastomer, rubber, poly-rubber or plastic material. In other examples, brace 110 may be a molded material, such as an injection molded polymer. The flexibility of brace 110 allows tail fan support 100 to be secured to fan out tailfeathers 82 of various size turkeys without damaging the calamus of the outer tailfeathers 83. The tailfeathers 82 of turkey 80 are operably coupled to one another as a natural fan such that it is only necessary to hold outer tailfeathers 83 in order to maintain tailfeathers 82 in the fanned-out configuration.

In the example of tail fan support 100, fasteners 134 include open hooks extending around calamus of the outer tailfeathers 83. Fasteners 134 may be formed from metal, such as a bent metal wire. The wire of fasteners 134 may be stiff enough to resist bending during normal use of tail fan support 100. Brace 110 and fasteners 134 are configured as s-hooks threaded through holes 114 in brace 110 with one side of the s-hooks pinched to brace 110, although other configurations are also possible. In other examples, fasteners 134 may be replaced by different fasteners, such as clips, or loops, either integral with brace 110 or attached to brace 110 in any suitable manner.

Tail fan support 100 is sized to mate with the outer tailfeathers 83 on either side of pope's nose 84 of turkey 80. For example, brace 110 may be from 5-14 inches long, such as about 9 inches long. In addition, fasteners 134 are sized to receive the calamus of the outer tailfeathers 83. For example, the open loops of fasteners 134 may form a hook shape with an inner opening of between 0.2 to 1.0 inches, such as about 0.375 inches.

Tail fan support 100 further includes a u-shaped pin 132 configured to extend through holes 112 in the brace 110 and sunk into the turkey's pope's nose 84, thereby pinning brace 110 against the pope's nose 84. The angle of pin 132 in the pope's nose 84 of the turkey can be selected by a user to adjust the angle of the fanned out tailfeathers 82 relative to the body of turkey 80. While a range of pin sizes may be suitable, the inventors found that u-shaped pin 132 from 3-8 inches long, such as about 6 inches long were suitable for use as pin 132.

Figure 7:
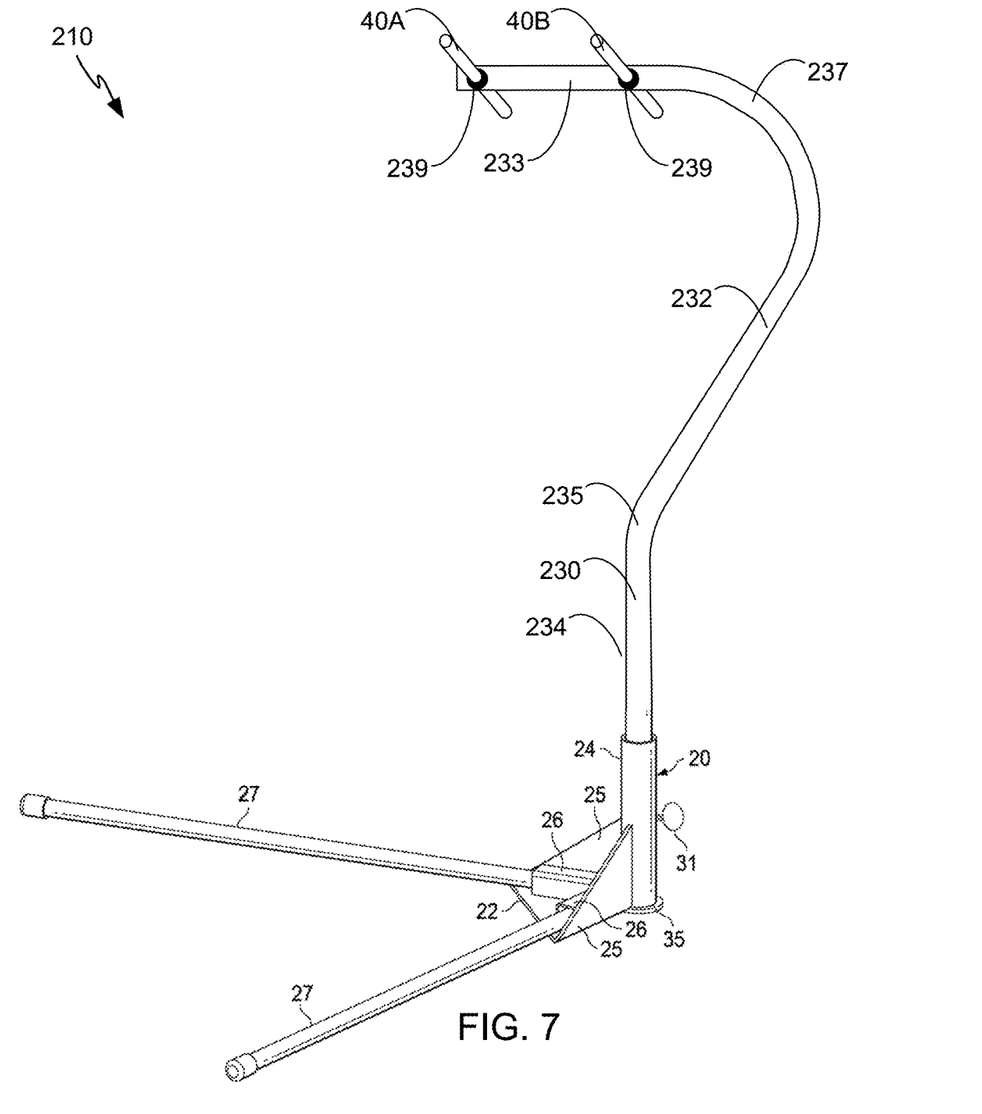
FIG. 7 illustrates an alternative embodiment of a bird stand.

FIG. 7 illustrates a bird stand 210. Bird stand 210 is substantially similar to bird stand 10 except that bar 30 has been replaced with bar 230. All other details and configurations of bird stand 210 are the same as bird stand 10. For example, bird stand 210 may be included in a kit with tail fan support 100. For brevity, some details in common with bird stand 10 are not repeated with respect to bird stand 210.

Stand 210 is an assembly including a base 20 with removable legs 27, a bar 230 extending upright from base 20, and a mounting bars 40A, 40B (collectively, "bars 40") on the end of bar 230. Mounting bars 40 are mounted to an end 233 of bar 230 opposite base 20 and extending over base 20. Mounting bars 40 are straight sections of tubing extending through holes 239 in end 233 of bar 230. Mounting bars 40 include grommets 42 to prevent mounting bars 40 from sliding out of holes 239.

A bird, such as turkey 80 is supported by placing the ankles of the bird over either side of the mounting bar 40A, and the knee joint around mounting bar 40B. The legs are wedged against both mounting bars 40A, 40B by the body weight of the bird, and the bird is thereby supported in the upright position shown in FIG. 1.

Holes 239 are spaced to conform to the anatomy of a supported bird. For example, holes 239 may be spaced between 23 inches and 10 inches, such as about 4-6 inches for turkeys, such as about 5 inches for turkeys. Likewise, the length of mounting bars 40 is selected to fit the anatomy of the bird while allowing mounting bars to remain hidden. In some examples, the mounting bars 40 are between 4 inches and 12 inches in length, such as between 6 inches and 10 inches in length for turkeys such as about 8 inches in length for turkeys.

In this manner, mounting bars 40 securely attached to the legs of a bird, while bar 230 and base 20 provide a stable frame to support the body of the bird in an upright position. Moreover, as shown in FIG. 1, the assembly of stand 210 is largely hidden from view behind the body of the bird, thereby providing an opportunity to pose with the bird in a natural position for photographs following a successful hunt.

Bar 230 includes a straight portion 234 extending upward from base 20 and a curved section 232 extending over base 20. The curved section 232 includes a s-curve with a lower portion 235 of the s-curve extending away from the base 20 and an upper portion 237 of the s-curve extending back over the base 20.

In the illustrated example, thumb screw 31 secures the end of bar 230 within tube 24, and may be used to fix the angle of mounting bars 40 relative to base 20. In other examples, a different mechanism, such as a pin or spring clip, may be used to secure the end of bar 230 within tube 24. In further examples, the end of bar 230 may simply provide a close or interference fit with tube 24.

The specific techniques holding a bird in an upright position, such as techniques embodied by bird stand 10, tail fan support 100, and bird stand 210 are merely illustrative of the general inventive concepts included in this disclosure as defined by the following claims.

The invention claimed is:

1. An assembly for supporting a turkey in an upright position, the assembly comprising:
    a base configured to support the assembly and the turkey in the upright position;
    a bar including a first straight section extending upright from the base, a curved section extending over the base and a second straight section extending further over the base;
    a first mounting bar including a first portion of the first mounting bar extending outwardly from a first side of the second straight section, and a second portion of the first mounting bar extending outwardly from an opposing second side of second straight section, the first mounting bar being four to twelve inches in length; and
    a second mounting bar including a first portion of the second mounting bar extending outwardly from the first side of the second straight section, and a second portion of the second mounting bar extending outwardly from an opposing second side of second straight section, the second mounting bar being four to twelve inches in length,
    wherein the first mounting bar is spaced three to ten inches from the second mounting bar, and
    wherein the spacing of the first mounting bar and the second mounting bar facilitates positioning legs of the turkey over the first and second mounting bars such that ankles are over one of the mounting bars and knees are around the other of the mounting bars.

2. The assembly of claim 1,
    wherein the first mounting bar is a unitary component extending through a first hole in the second straight section,
    wherein the second mounting bar a unitary component extending through a second hole in the second straight section, and
    wherein the first hole is spaced four to six inches from the second hole,
    the assembly further comprising grommets on either side of the first mounting bar and the second mounting bar to secure the first and second mounting bars within the first and second holes.

3. The assembly of claim 1, wherein the curved section includes a s-curve with a lower portion of the s-curve extending away from the base and an upper portion of the s-curve extending back over the base.

4. An assembly comprising:
    a base;
    a bar including a first straight section extending upright from the base, a curved section extending over the base and a second straight section extending further over the base;
    a first mounting bar extending through a first hole in the second straight section;
    a second mounting bar extending through a second hole in the second straight section; and
    a turkey, wherein legs of the turkey are positioned over the mounting bars such that ankles are over one mounting bar and knees are around the other mounting bar.

5. The assembly of claim 4, further comprising pins configured to secure a head and neck of the turkey to its body, and to spread out tailfeathers of the turkey and pin the tailfeathers in an upright position relative to the body.

6. The assembly of claim 4, further comprising a tail fan support, the tail fan support including a brace including fasteners attached to outer tailfeathers of the turkey to fan out the tailfeathers of the turkey.

7. A kit comprising:
    a bar including a first straight section, a curved section extending over a base and a second straight section extending further over the base;
    a first mounting bar extending through a first hole in the second straight section;
    a second mounting bar extending through a second hole in the second straight section; and
    the base, wherein the base includes:
        a planar platform;
        an upwardly oriented tube fixed at an angle to the planar platform, the upwardly oriented tube configured to removably receive a second end of the bar, the second end of the bar being opposite the second straight section;
        leg tubes aligned with and fixed to the planar platform; and
        removable legs configured for insertion in the leg tubes.

8. The kit of claim 7, further comprising grommets on either side of the first mounting bar and the second mounting bar to secure the first and second mounting bars within the first and second holes.

9. The kit of claim 7, wherein the mounting bars are between 4 inches and 12 inches in length.

10. The kit of claim 7, wherein the first hole is spaced from the second hole by between 3 inches and 10 inches.

11. The kit of claim 7, wherein the base further includes one or more gussets extending between the planar platform and the upwardly oriented tube.

12. The kit of claim 11, wherein the planar platform and the one or more gussets are a unitary component formed from a bent plate.

13. The kit of claim 7, wherein the curved section includes a s-curve with a lower portion of the s-curve extending away from the base and an upper portion of the s-curve extending back over the base.

14. The kit of claim 7, further comprising pins configured to secure a head and neck of a bird to its body, and to spread out tailfeathers of the bird and pin the tailfeathers in an upright position relative to the body.

15. The kit of claim 7, further comprising a tail fan support, the tail fan support including a brace including fasteners configured to attach to outer tailfeathers to fan out tailfeathers of a turkey.

16. The kit of claim 15, wherein the tail fan support includes a pin extending through holes in the brace and sunk into the turkey's pope's nose.

17. The kit of claim 15, wherein the fasteners include open hooks extending around calamus of the outer tailfeathers.

18. The kit of claim 15, wherein the brace is formed from a compliant material with a central bend shaped to curve over the turkey's pope's nose with the fasteners below the pope's nose to facilitate securing the outer tailfeathers with the fasteners and broadly fan out the tailfeathers of the turkey.

19. A kit for supporting a turkey in an upright position, the kit comprising:
- a base configured to support the kit and the turkey in the upright position;
- a bar including a first straight section, a curved section extending over the base and a second section extending further over the base;
- a first mounting bar including a first portion of the first mounting bar extending outwardly from a first side of the second section, and a second portion of the first mounting bar extending outwardly from an opposing second side of second straight section; and
- a second mounting bar including a first portion of the second mounting bar extending outwardly from the first side of the second straight section, and a second portion of the second mounting bar extending outwardly from an opposing second side of second straight section,
- wherein the second section includes receptacles configured to receive the first and second mounting bars such that spacing of the first mounting bar and the second mounting bar along the second section facilitates positioning legs of the turkey over the first and second mounting bars such that ankles are over one of the mounting bars and knees are around the other of the mounting bars,
- wherein the base includes:
  - an upwardly oriented base receptacle configured to removably receive a second end of the bar, the second end of the bar being opposite the second straight section; and
  - removable legs extending outwardly and transverse to the upwardly oriented base receptacle underneath the second straight section.

20. The kit of claim 19, wherein the spacing of the first mounting bar and the second mounting bar along the second section is between 3 inches and 10 inches.

21. The kit of claim 20, wherein the mounting bars are between 4 inches and 12 inches in length.

22. The kit of claim 19, wherein the upwardly oriented base receptacle includes an upwardly oriented tube that removably receives the bar opposite the second straight section.

23. The kit of claim 19, wherein the base includes a planar platform, and removable legs extending outwardly and generally parallel to the planar platform underneath the second straight section.

24. The kit of claim 19, further comprising a tail fan support, the tail fan support including a brace including fasteners configured to attach to outer tailfeathers to fan out tailfeathers of a turkey.

25. The kit of claim 24, wherein the tail fan support includes a pin extending through holes in the brace and sunk into the turkey's pope's nose.

26. The kit of claim 24, wherein the fasteners include open hooks extending around calamus of the outer tailfeathers.

27. The kit of claim 24, wherein the brace is formed from a compliant material with a central bend shaped to curve over the turkey's pope's nose with the fasteners below the pope's nose to facilitate securing the outer tailfeathers with the fasteners and broadly fan out the tailfeathers of the turkey.

28. The kit of claim 24, further comprising pins configured to secure a head and neck of the turkey to its body.

* * * * *